US012776642B2

(12) United States Patent
Wolford et al.

(10) Patent No.: US 12,776,642 B2
(45) Date of Patent: Oct. 27, 2026

(54) PREVENTING THERMAL EVENTS IN A MULTIPHASE VOLTAGE REGULATOR DEVICE

(71) Applicant: Lenovo Global Technology (UnitedStates) Inc., Morrisville, NC (US)

(72) Inventors: Robert R Wolford, Strongsville, OH (US); Brian C Totten, Durham, NC (US); Ananthakrishnan Narayanan, Durham, NC (US); James Loebach, Cary, NC (US); Paul Klustaitis, Cary, NC (US)

( * ) Notice: Subject to any disclaimer, the term of this patent is extended or adjusted under 35 U.S.C. 154(b) by 214 days.

(21) Appl. No.: 18/827,938

(22) Filed: Sep. 9, 2024

(65) Prior Publication Data

US 2026/0074510 A1 Mar. 12, 2026

(51) Int. Cl.
*H02H 7/12* (2006.01)

(52) U.S. Cl.
CPC .................................. *H02H 7/1213* (2013.01)

(58) Field of Classification Search
CPC ................................ H02H 7/1213; G05F 1/40
USPC .......................................................... 361/91.1
See application file for complete search history.

(56) References Cited

U.S. PATENT DOCUMENTS 8,829,872 B1 * 9/2014 Pierson ................... H02M 1/14 323/272
9,621,045 B2 * 4/2017 Tang ...................... G01R 31/42
10,069,421 B2 * 9/2018 Todorov .............. H02M 3/1584
10,277,127 B2 * 4/2019 Mattingly ........... H02M 3/1584
10,693,361 B2 * 6/2020 Guo ...................... H02H 7/1213
11,641,163 B2 * 5/2023 Capetillo ............ H02M 1/0009 363/16
2003/0020442 A1 * 1/2003 Hwang ................. H02M 1/092 323/288
2012/0039007 A1 * 2/2012 Turchi ................ H02M 3/1584 361/87
2012/0068674 A1 * 3/2012 Yu ....................... H02M 3/1584 323/271
2014/0002044 A1 * 1/2014 Babazadeh ......... H02M 3/1588 323/282
2015/0236595 A1 * 8/2015 Babazadeh ........... H02M 3/157 323/272

(Continued)

*Primary Examiner* — Dharti H Patel
(74) *Attorney, Agent, or Firm* — Jeffrey L. Streets

(57) ABSTRACT

A multiphase voltage regulator device (VRD) includes powerstages coupled in parallel between a power input and a voltage regulator power output, each powerstage including a power output stage and a control circuit connected to the power output stage. The VRD further includes a controller connected with the control circuit of each powerstage and a plurality of current sensors, wherein each current sensor measures the amount of current passing through the power output stage of one of the powerstages. The controller is configured to assert a hard short signal to the control circuit of one or more powerstage in response to the measured amount of current passing through any of the powerstages being greater than a predetermined current threshold. Upon receiving the hard short signal, the control circuit is configured to hold the output power stage of the powerstage in a hard short condition by connecting the power input to ground.

20 Claims, 3 Drawing Sheets

(56) References Cited

U.S. PATENT DOCUMENTS

| | | | | |
|---|---|---|---|---|
| 2016/0128144 | A1* | 5/2016 | Tikkanen | H05B 45/3725 315/301 |
| 2018/0314281 | A1* | 11/2018 | Remis | G05B 15/02 |
| 2021/0336528 | A1* | 10/2021 | Zafarana | H02M 3/1584 |
| 2022/0109368 | A1* | 4/2022 | Zhou | H02M 3/1586 |
| 2022/0368220 | A1* | 11/2022 | Chang | H02M 1/0035 |
| 2025/0116728 | A1* | 4/2025 | R | H02M 3/33576 |
| 2026/0135471 | A1* | 5/2026 | Mahajan | H02M 1/32 |

* cited by examiner

PREVENTING THERMAL EVENTS IN A MULTIPHASE VOLTAGE REGULATOR DEVICE

BACKGROUND

The present disclosure relates to the operation and control of multiphase voltage regulators.

BACKGROUND OF THE RELATED ART

Multiphase voltage regulator devices (VRDs) are an efficient method to deliver power to high current loads, such as central processing units (CPUs), application specific integrated circuits (ASICs), and graphics processing units (GPUs). In a multiphase VRD, there are two or more powerstages. Each powerstage is used to incrementally provide energy to the load. The aggregate amount of current and energy from all the powerstages is much higher than what a single powerstage can provide.

A defective powerstage can fail at any time, such as during an initial power-up, a short time later after power-up or even a long time later in a production datacenter. If the VRD suffers a catastrophic failure, then smoking, burning, and/or an open flame can occur. If the event is too severe, these conditions can trigger a fire suppression system and bring down an entire datacenter. Therefore, it's important to take protective steps that prevent a catastrophic powerstage failure from progressing to an event that causes smoking, burning, or an open flame.

All of the powerstages in the VRD are controlled by a VRD controller, which may be implemented as a separate VRD controller chip. Under normal conditions, the VRD send pulse-width modulation (PWM) pulses to the powerstages to control the power output from the VRD to a load. The VRD controller is constantly checking for abnormalities in the operation of the VRD and attempts to prevent a runaway VRD failure. To stop a powerstage failure from progressing into an undesirable event beyond the VRD, it's important to quickly remove the bulk voltage rail or input voltage rail (e.g., 12V) that is supplying energy to the faulty powerstage. All modern multiphase VRD controllers can sense when a powerstage is operating outside its normal operating conditions. For example, a multiphase VRD controller can detect whether any powerstage has a current exceeding its established current limit, whether any powerstage has a temperature exceeding its established temperature limit, and whether any powerstage has an output voltage that is too high. When the VRD controller detects a critical problem with any of the powerstages, the VRD controller will attempt to disable all of the powerstages, thereby preventing the problem from progressing to the point where smoke, burning, or flame can occur. Typically, the VRD controller will disable all of the powerstages by no longer sending pulse-width modulation pulses to the powerstages.

BRIEF SUMMARY

Some embodiments provide a multiphase voltage regulator device comprising a plurality of powerstages coupled in parallel between a power input and a voltage regulator power output, each powerstage including a power output stage and a control circuit connected to the power output stage. The multiphase voltage regulator device further comprises a controller connected for communication with the control circuit of each powerstage and a plurality of current sensors, wherein each current sensor measures the amount of current passing through the power output stage of one of the powerstages. In addition, the controller is configured to assert a hard short signal to the control circuit of one or more of the powerstages in response to identifying that the measured amount of current passing through any of the powerstages is greater than a predetermined current threshold, and wherein, for the one or more of the powerstages receiving the hard short signal, the control circuit of the powerstage is configured to hold the output power stage of the powerstage in a hard short condition by connecting the power input to a ground terminal in response to receiving the hard short signal.

Some embodiments provide a system comprising the multiphase voltage regulator device according to one or more embodiments described herein and a power supply having a power supply output connected to the power input of the multiphase voltage regulator device. The power input of the multiphase voltage regulator device is connected to the power output stage of each of the powerstages, and the power supply automatically removes power from the multiphase voltage regulator device in response to the power supply detecting an over-current condition caused by the hard short condition of the one or more powerstages.

Some embodiments provide a system comprising the multiphase voltage regulator device according to one or more embodiments described herein, a power supply having a power supply output for supplying power to the multiphase voltage regulator device, and an eFuse connected between the power supply output and the power input to the multistage voltage regulator device. The eFuse is configured to automatically remove power from the multi-stage voltage regulator device in response to the eFuse detecting an over-current condition caused by the hard short condition of the one or more powerstages.

Some embodiments provide a multiphase voltage regulator device comprising a plurality of powerstages coupled in parallel between a power input connector and a voltage regulator power output connector. The multiphase voltage regulator device further comprises a plurality of current sensors, wherein each current sensor measures the amount of current passing through one of the powerstages. Still further, the multiphase voltage regulator device further comprises a field-effect transistor that is not part of the powerstages, wherein the field-effect transistor has a source terminal connected to the power input connector, a drain terminal connected to a ground connector, and a gate. The multiphase voltage regulator device also comprises a controller connected to each powerstage, each current sensor, and the gate of the field-effect transistor, wherein the controller is configured to assert a hard short signal to the gate of the field-effect transistor in response to identifying that the measured amount of current passing through any of the powerstages is greater than a predetermined current threshold, and wherein the hard short signal causes the field-effect transistor to turn on and cause a hard short condition by electrically connecting the power input connector to the ground connector.

Some embodiments provide a method comprising a controller of a multiphase voltage regulator device controlling the operation of a plurality of powerstages coupled in parallel between a power input connector and a voltage regulator power output connector, wherein each powerstage includes a power output stage and a control circuit that is connected to the power output stage and the controller. The method further comprises the controller monitoring an amount of current measured by each of a plurality of current sensors, wherein each current sensor measures the amount of current passing through the power output stage of one of the powerstages. Still further, the method comprises the controller identifying that the measured amount of current passing through the power output stage of any of the powerstages is greater than a predetermined current threshold, and asserting a hard short signal to the control circuit of one or more of the powerstages in response to identifying that the measured amount of current passing through the power output stage of any of the powerstages is greater than a predetermined current threshold, wherein, for the one or more of the powerstages receiving the hard short signal, the control circuit of the powerstage is configured to hold the output power stage of the powerstage in a hard short condition by electrically connecting the power input connector to a ground connector in response to receiving the hard short signal.

DETAILED DESCRIPTION

Figure 1:
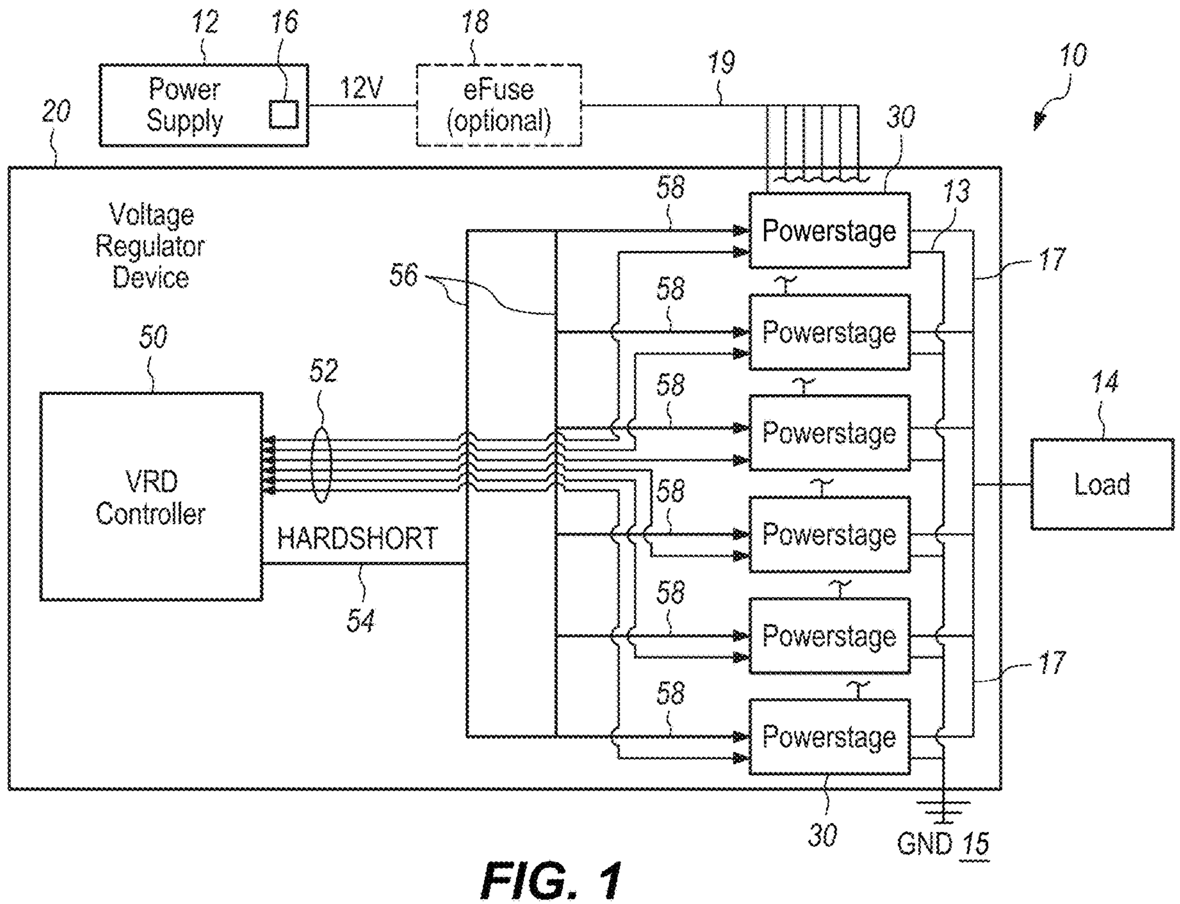
FIG. 1 is a diagram of a system including a voltage regulator device (VRD) having a plurality of powerstages and a VRD controller connected to each of the powerstages.

Some embodiments provide a multiphase voltage regulator device comprising a plurality of powerstages coupled in parallel between a power input and a voltage regulator power output, each powerstage including a power output stage and a control circuit connected to the power output stage. The multiphase voltage regulator device further comprises a controller connected for communication with the control circuit of each powerstage and a plurality of current sensors, wherein each current sensor measures the amount of current passing through the power output stage of one of the powerstages. In addition, the controller is configured to assert a hard short signal to the control circuit of one or more of the powerstages in response to identifying that the measured amount of current passing through any of the powerstages is greater than a predetermined current threshold, and wherein, for the one or more of the powerstages receiving the hard short signal, the control circuit of the powerstage is configured to hold the output power stage of the powerstage in a hard short condition by connecting the power input to a ground terminal in response to receiving the hard short signal.

The power input to the multiphase voltage regulator device is configured to be connected to the power output from a power supply and the voltage regulator power output is configured to be connected to a load, such as one or more electronic components of a computer server, compute node, networking hardware or other type of electronic equipment. It is the controller of the multiphase voltage regulator device that is responsible for causing the control circuit of each powerstage to control the amount of power that is delivered to the voltage regulator power output for use by the load. Furthermore, the controller monitors the amount of electrical current passing through each powerstage. For example, the controller may obtain the current measurement from a current sensor within the powerstage or from a separate current sensor connected to the output of the powerstage. When the monitored amount of electrical current passing through each powerstage is determined to be outside its normal operating range (i.e., greater than the predetermined current threshold), the controller asserts a hard short signal to the control circuit of one or more of the powerstages. Specifically, the controller of the multiphase voltage regulator device may assert a hard short signal to any or all of the powerstages in response to detecting that any powerstage has a current exceeding an established current limit. Furthermore, the controller may be configured to assert a hard short signal to the control circuit of the one or more powerstages without disabling the one or more powerstages in response to identifying that the measured amount of current passing through any of the powerstages is greater than a predetermined current threshold.

Embodiments herein provide the technical benefit of responding to a high current condition in a powerstage by detecting a high current condition that is likely being caused by a soft short in a faulty powerstage and intentionally causing a hard short in any or all of the powerstages. The hard short immediately causes the over-current protection limit in an upstream eFuse and/or PSU to be exceeded, such that eFuse and/or PSU will quickly remove power (i.e., a 12V power rail) from all of the powerstages before the soft short has time to generate high localized heating, smoking, burning or an open flame. Intentionally invoking the hard short causes a severe overcurrent condition to trigger the eFuse and/or power supply much sooner than the point where localized heating and smoking, burning, or an open flame can occur.

A soft short is defined as a short circuit between the powerstage's input voltage (e.g., 12V) and ground (GND) having an electrical resistance that is low enough to cause a thermal event on the VRD powerstage yet high enough that the resulting current draw will not trip the over-current protection limit of an upstream eFuse or power supply unit (PSU). An electrical resistance of a soft short could be, without limitation, in the range of about tens to hundreds of mOhms (m$\Omega$). Over time, the soft short will generate high localized heating which can damage the powerstage as well as the nearby printed circuit board and conductive traces. The localized heating can ultimately lead to a smoking, burning or open flame incident. Eventually, carbonization of the material (i.e., the printed circuit board (PCB) traces, PCB vias, PCB epoxy resin, powerstage packaging material, powerstage die) may lead to a low enough resistance that the amount of electrical current through the powerstages will trip the upstream eFuse or PSU overcurrent protection. However, significant thermal damage may have already occurred at the point that the overcurrent protection limit is reached. It should be appreciated that the short circuit still exists even if the controller commands the disabling of the affected powerstage.

In contrast to a soft short, a hard short is defined as a short circuit (e.g., between an input voltage of the multiphase voltage regulator device and ground) that has a lower electrical resistance than a soft short and that results in a current draw that trips the over-current protection limit of an upstream eFuse or PSU. Deliberately creating a hard short by clamping a power rail, such as a 12 Volt (V) power rail, to ground (GND) through a low-resistance path on one or more of the powerstages, such as some or all of the powerstages in parallel, could potentially result in additional electrical damage in one or more of the healthy powerstages. However, preventing the soft short from becoming a thermal event is higher priority than preventing electrical damage to a single compute node or other individual unit of equipment, since a smoke, burn and/or fire incident could ultimately bring down an entire rack of equipment or an entire datacenter. Furthermore, if a powerstage of a VRD is already exhibiting a soft short condition, the server motherboard will need to be replaced anyway because the powerstages are soldered to the motherboard and are not serviceable by an end user. Embodiments take advantage of the capabilities in at least the remaining good (healthy) powerstages to cause an indirect shutdown of the server if an electrical short circuit has been detected.

In some embodiments of the multiphase voltage regulator device, the current sensor that measures the amount of current passing through the power output stage of each powerstage may be included in the powerstage. Where each current sensor is included within a respective one or the powerstages, the current sensor may be connected to the control circuit of the same powerstage and report the measured amount of current to the control circuit. Accordingly, the control circuit of each powerstage may then report the measured amount of current to the controller. Alternatively, the current sensor for each powerstage may be outside the individual powerstage, yet still connected to the controller so that the measured amount of current for each powerstage is output from a corresponding current sensor to the controller.

In some embodiments, the multiphase voltage regulator device may further comprise a dedicated conductive line connected from the controller to the control circuit of each powerstage for transmitting the hard short signal to each powerstage. The dedicated conductive line for the hard short signal may be separate from any other communication line between the controller and the control circuits, which may be used from other control signals such as a pulse width modulation (PWM) signal. Such a dedicated control signal line (e.g., a "HARDSHORT" conductive trace) is connected from the controller to each of the powerstages to ensure that the hard short operation is completed relatively quickly and reliably. In one option, the dedicated conductive line includes a loop, a first branch connecting the loop to the controller, and, for each of the powerstages, a branch connecting the loop to the control circuit of the powerstage. The inclusion of the loop in the dedicated conductive line provides a degree of redundancy, since the connection to some or all of the powerstages is maintained even if one end of the dedicated conductive line (that is, the HARDSHORT conductive trace) is damaged. For example, a portion of the dedicated conductive line may have already become damaged by a powerstage failure.

In some embodiments, each powerstage of the multiphase voltage regulator device may include an internal pull down resistor connecting the dedicated conductive line to ground. The internal pull down resistor pulls the dedicated conductive line down to ground potential so that the powerstages are not inadvertently hard shorted.

In some embodiments, each powerstage (e.g., the power output stage thereof) may include a high-side (HS) field-effect transistor (FET) having a source terminal connected to the power supply, a low-side (LS) FET having a drain terminal connected to ground, a power output terminal connected between a drain terminal of the HS FET and a source terminal of the LS FET, and an inductor connected between the power output terminal and the load. Furthermore, each powerstage may include a first driver having an output connected to a gate of the HS FET and a second driver having an output connected to a gate of the LS FET. The control circuit for each powerstage is connected to an input to the first driver to control whether the first driver applies a signal to the gate of high-side field-effect transistor and is connected to an input to the second driver to control whether the second driver applies a signal to the gate of the low-side field-effect transistor.

The control circuit of each powerstage may perform various functions, including direct control over the first and second drivers (and therefore control over the HS FET and the LS FET) and handling of the current measurements output by the current sensor for the powerstage.

When a powerstage receives the hard short signal from the controller, the control circuit for the powerstage will implement the hard short, such as by turning on both the HS FET and the LS FET at the same time to drive the powerstage, and hence the multiphase voltage regulator device itself, to a hard short condition and over-current condition. By rapidly driving the voltage regulator device to a high current condition, an upstream eFuse or power supply unit (PSU) will quickly sense the high current condition and shut down power to the voltage regulator device to prevent or terminate a thermal event. For example, where the multiphase voltage regulator device is a component of a server, the high current condition may cause the entire server to be immediately shut down. However, quickly and intentionally causing the high current condition will quickly trigger the removal of power from the multiphase voltage regulator device and prevent a catastrophic failure in the multiphase voltage regulator device that could lead to a smoking, burning, or an open-flame incident.

When the controller of the multiphase voltage regulator device outputs a hard short signal, the hard short signal is preferably sent to all of the powerstages, including both the "good powerstages" and the compromised/damaged soft shorting powerstage, and received and implemented by as many of the powerstages that are capable of doing so. However, embodiments may cause hard shorting of any of the one or more powerstages (either the damaged powerstage and/or one or more good powerstage) so long as the resulting hard short causes a high current condition that is sufficient to trigger the upstream eFuse and/or PSU over-current protection. Hard shorting all of the powerstages leads to the maximum current being sunk from the upstream one or more power supplies and, therefore, ensures that the eFuse and/or the one or more power supplies will quickly sense the short and shut down power to the voltage regulator device.

In some embodiments of the multiphase voltage regulator device, each powerstage includes a first driver and a second driver, wherein the first driver has a first driver input connected to the control circuit and a first driver output connected to a gate of the high side field-effect transistor, and wherein the second driver has a second driver input connected to the control circuit and a second driver output connected to a gate of the low side field-effect transistor. In one option, in response to a hard short signal, the control circuit of each powerstage receiving the hard short signal may be configured to hold the output power stage of the powerstage in a hard short condition by causing the first driver to apply a first output voltage to the gate of the HS FET to turn on the HS FET and causing the second driver to apply a second output voltage to the gate of the LS FET to turn on the LS FET. The hard short is preferably held until the voltage regulator is no longer receiving power.

Some embodiments provide a system comprising the multiphase voltage regulator device according to one or more embodiments described herein and a power supply having a power supply output connected to the power input of the multiphase voltage regulator device. The power input of the multiphase voltage regulator device is connected to the power output stage of each of the powerstages, and the power supply automatically removes power from the multiphase voltage regulator device in response to the power supply detecting an over-current condition caused by the hard shorting of the one or more powerstages. The over-current condition is characterized by an amount of current that is greater than an over-current protection limit for the power supply. Accordingly, causing the control circuit to hold the output power stage of the one or more powerstages in a hard short condition places the power supply into the over-current condition relatively quickly, if not immediately. Specifically, the hard short causes a path between the power supply and ground that has a lower resistance than a soft short. So, the hard short condition preferably causes the power supply to remove power from the multiphase voltage regulator device in less time than waiting for a soft short condition in any of the powerstages to cause the power supply to remove power from the multiphase voltage regulator device. In one option, the system may further comprise a computer server (or other computing or networking hardware), wherein the multiphase voltage regulator device has a power output providing power to run multiple components of the computer server, and wherein the automatic shut off of power to the multiphase voltage regulator device prevents the computer server from experiencing a smoking, burning, or open-flame event.

Some embodiments provide a system comprising the multiphase voltage regulator device according to one or more embodiments described herein, a power supply having a power supply output for supplying power to the multiphase voltage regulator device, and an eFuse connected between the power supply output and the power input to the multi-stage voltage regulator device. The eFuse is configured to automatically remove power from the multi-stage voltage regulator device in response to the eFuse detecting an over-current condition caused by the hard short condition of the one or more powerstages.

Some embodiments provide an alternative multiphase voltage regulator device comprising a plurality of powerstages coupled in parallel between a power input connector and a voltage regulator power output connector. The multiphase voltage regulator device further comprises a plurality of current sensors, wherein each current sensor measures the amount of current passing through one of the powerstages. Still further, the multiphase voltage regulator device further comprises a dedicated or external FET that is not part of the powerstages, wherein the dedicated FET has a source terminal connected to the power input connector, a drain terminal connected to a ground connector, and a gate. The multiphase voltage regulator device also comprises a controller connected to each powerstage, each current sensor, and the gate of the dedicated FET, wherein the controller is configured to assert a hard short signal to the gate of the dedicated FET in response to identifying that the measured amount of current passing through any of the powerstages is greater than a predetermined current threshold, and wherein the hard short signal causes the dedicated FET to turn on and cause a hard short condition by electrically connecting the power input connector to the ground connector. The controller is preferably connected to the dedicated FET by a driver, where the driver input is connected to the controller and the driver output is connected to the gate of the dedicated FET.

The alternative multiphase voltage regulator device may control the dedicated FET in the same manner as any of the previous embodiments controlled a power output stage to place the power output stage in a hard short condition. However, the controller may have a dedicated conductive line to the dedicated FET without requiring any change in the construction or operation of the powerstages. For example, the controller may have a new output for sending the hard short signal to the dedicated FET that is not part of any of the power stages. Since the dedicated FET is not part of any of the power stages, a hard short may be created by turning on the dedicated FET without needing to turn on both a HS FET and a LS FET of one or more powerstages as in previous embodiments. Turning on this external, dedicated FET connects the power rail (i.e., 12V source) to ground, which results relatively quickly in an overcurrent condition at the upstream eFuse or power supply. The power supply or eFuse will then shut down power to the multiphase voltage regulator device relatively quickly or immediately.

In some embodiments of the alternative multiphase voltage regulator device, the powerstages, current sensors, dedicated FET and controller may be installed on a printed circuit board (PCB), wherein the dedicated FET is secured in a socket on the printed circuit board allowing the dedicated FET to be field-replaceable. Accordingly, if the power to the voltage regulator is shut down before any of the powerstages are damaged, then the dedicated FET may be replaced if it is damaged during use, potentially increasing the lifespan of the printed circuit board.

In some embodiments, the hard short signal asserted by the controller may be a power good (PGOOD) signal. The power good (PGOOD) signal is an existing signal that may be used instead of a dedicated HARDSHORT signal. This may simplify the control logic used by the controller but may not require any change to the physical configuration of the multiphase voltage regulator devices herein.

Some embodiments provide a method comprising a controller of a multiphase voltage regulator device controlling the operation of a plurality of powerstages coupled in parallel between a power input connector and a voltage regulator power output connector, wherein each powerstage includes a power output stage and a control circuit that is connected to the power output stage and the controller. The method further comprises the controller monitoring an amount of current measured by each of a plurality of current sensors, wherein each current sensor measures the amount of current passing through the power output stage of one of the powerstages. Still further, the method comprises the controller identifying that the measured amount of current passing through the power output stage of any of the powerstages is greater than a predetermined current threshold, and asserting a hard short signal to the control circuit of one or more of the powerstages in response to identifying that the measured amount of current passing through the power output stage of any of the powerstages is greater than a predetermined current threshold, wherein, for the one or more of the powerstages receiving the hard short signal, the control circuit of the powerstage is configured to hold the output power stage of the powerstage in a hard short condition by electrically connecting the power input connector to a ground connector in response to receiving the hard short signal.

The operations of any of the methods disclosed herein may be implemented as a computer program product comprising a non-volatile computer readable medium and non-transitory program instructions embodied therein, the program instructions being configured to be executable by a processor to cause the processor to perform operations. For example, the controller may include at least one non-volatile storage device storing program instructions and at least one processor configured to process the program instructions.

FIG. 1 is a diagram of a system 10 including a multiphase voltage regulator device (VRD) 20 having a plurality of powerstages (6 shown) 30 and a VRD controller 50 connected to each of the powerstages 30. The system 10 further includes a power supply 12 for supplying electrical power to the multiphase voltage regulator device 20, which regulates the voltage of the power that is ultimately supplied to a load 14. For example, the load 14 could be a set of components in a server or other computing or networking hardware. In the system 10, current from the power supply 12 passes through an optional eFuse 18 and a power cable 19 to the multiphase voltage regulator device 20. Within the multiphase voltage regulator device 20, the current is provided to each of the powerstages (6 shown) 30 and the output current from each of the powerstages 30 is delivered over line 17 to the load 14. To support the operation of the multiphase voltage regulator device 20, each powerstage 30 also has a connection 13 leading to ground (GND) 15.

The power supply 12 may have an over-current protection circuit 16 and/or the system may include a separate over-current protection circuit, such as the eFuse 18, in series between the power supply 12 and the multiphase voltage regulator device 20. However, the system 10 should have at least one over-current protection circuit 16, 18 to automatically shut down power to the multiphase voltage regulator device 20 any time that the multiphase voltage regulator device 20 draws an amount of current exceeding an over-current protection limit established by the over-current protection circuit.

During normal operation of the multiphase voltage regulator device 20, the controller 50 communicates with each of the powerstages 30 over communication lines 52 to control or enable how each of the powerstages 30 is to pass current to the load 14. For example, the controller 50 may provide a pulse-width modulation (PWM) signal to each powerstage to control the duty cycle of switches within the powerstages 30 in a manner that controls the average voltage output to the load 14. The same or similar (parallel) communication lines 52 may also provide current measurements from each powerstage 30 to the controller 50.

However, a faulty powerstage 30 may develop a soft short at any time during the life of the multiphase voltage regulator device 20. By monitoring the amount of current passing through each powerstage 30, the controller 50 may detect when the current exceeds a high current threshold that indicates the presence of a soft short in a particular powerstage 30. The controller 50 may then send a hard short signal to the powerstages 30 over a dedicated hard short signal line 54. An optional loop 56 may be included in the dedicated hard short signal line 54 to provide a degree of redundancy to the path of the line 54 in case a portion of the path is damaged by the developing soft short. For example, if any single point on the loop is damaged and can no longer transmit the hard short signal, the hard short signal may still be able to reach each of the powerstages 30 by another path around the loop 56. As shown, the dedicated hard short signal line 54 further includes branches 58 leading from the loop 56 to each individual powerstage 30.

Figure 2:
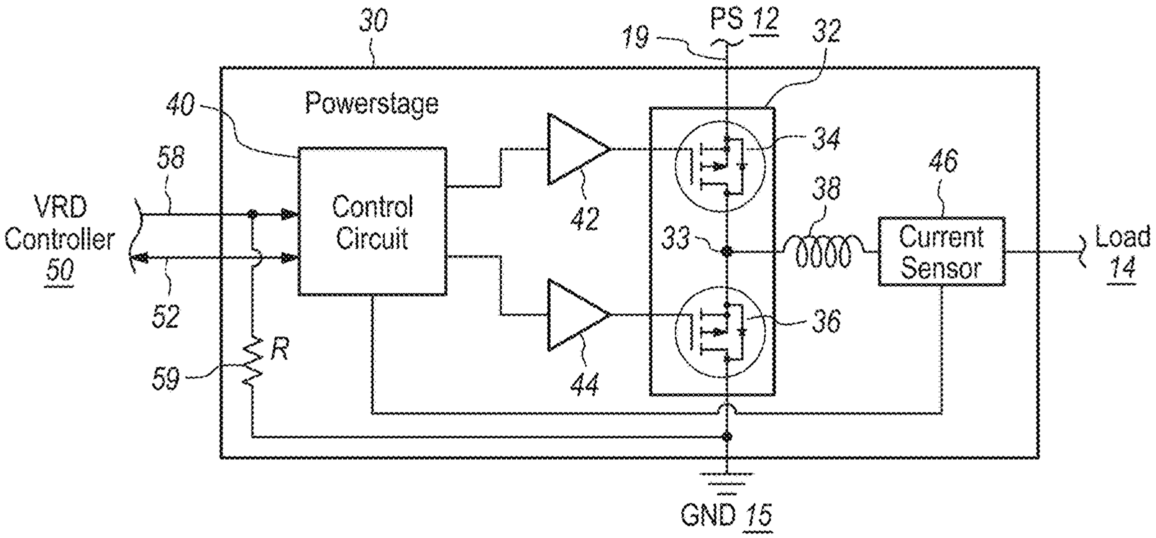
FIG. 2 is a diagram of a single powerstage, including a high-side field-effect transistor (HS FET) that is coupled to the input voltage rail and a low-side field-effect transistor (LS FET) that is coupled to ground.

FIG. 2 is a diagram of a single powerstage 30 having a control circuit 40 and a power output stage 32. The power output stage 32 includes a high-side field-effect transistor (HS FET) 34 and a low-side field-effect transistor (LS FET) 36. The high-side field-effect transistor (HS FET) 34 has a source terminal connected to the input voltage rail (or bulk voltage rail) 19 and the low-side field-effect transistor (LS FET) 36 has a drain terminal that is coupled to a ground terminal (or ground) 15. A drain terminal of the high-side field-effect transistor (HS FET) 34 and a source terminal of the low-side field-effect transistor (LS FET) 36 are connected together at point 33 where electrical current is passed to an inductor 38 before being output to the load 14. Although the powerstage 30 is shown as having p-channel enhancement mode FETs 34 and 36, it is understood that in some embodiments the HS FET 34 and/or LS FET 36 may be implemented using different types of transistors (e.g., n-channel) according to the design of the VRD 20 and/or the power requirements of the load 14. Further, the powerstage 30 and the HS FET 34 and LS FET 36 thereof may be configured differently (e.g., with the source and drain terminals of each oriented differently than that shown in FIG. 2). In some embodiments, the HS FET 34 and/or LS FET 36 may be implemented using silicon (Si), silicon carbide (SiC), gallium nitride (GaN), as examples. A current sensor 46 is also provided in or along the power output to the load 14. The current sensor 46 measures the amount of current output by the power output stage 32 and communicates the measured amount of current to the control circuit 40. The control circuit 40 then transmits the measured amount of current to the controller 50, such as over the communication line 52.

The current sensor 46 may include a circuit including a sense resistor and a sensor for measuring the voltage drop across the sense resistor, wherein the amount of current (I) is equal to the voltage (V) divided by the resistance (R). Alternatively, the current sensing may be performed with a sensor for measuring the voltage drop across the inductor 38. Still further, the current sensing may be performed with a sensor for measuring the voltage drop across drain and source pins of the HS FET 34 and/or the LS FET 36. The FETS 34, 36 will have an Rds, on value (the "on resistance") that may be exploited to measure the current through the FET by measuring the voltage across the drain and source. However, the Rds, on value can be very small, such that the resulting voltage is small and prone to error due to noise. Furthermore, the powerstage 30 could include a current mirror circuit that copies the amount of current through output power stage 32 and a current sensor in the current mirror circuit. In any of these configurations, the measured amount of current is transmitted to the control circuit 40 and forwarded to the controller 50.

During normal operation of the multiphase voltage regulator device 20, the control circuit 40 of the powerstage 30 receives a control signal, such as a pulse-width modulation signal, from the controller 50 via the communication line 52. The control circuit 40 receives this control signal and asserts a signal to the input of a first driver 42 and/or the input of a second driver 44. The output of the first driver 42 is connected to the gate of the HS FET 34 and the output of the second drive is connected to the gate of the LS FET 36. Accordingly, the control signal from the controller 50 is able to control the duty cycle or pulse-width modulation of the HS FET 34 and/or the LS FET 36 to provide a desired voltage to the load 14.

If the controller 50 determines that the amount of current measured by the current sensor 46 is greater than a high current threshold, the controller will provide an instruction or signal (e.g., the HARDSHORT signal) via the communication line 58 to the control circuit 40 to turn on both of the FETs 34, 36. A pull down resistor 59 may be connect the dedicated conductive line 58 to a ground terminal 15 to pull the dedicated conductive line down to ground potential so that the powerstage 30 is not inadvertently hard shorted. Turning on both of the FETs 34, 36 at the same time and holding them in this condition will create a low-resistance path between the power supply line 12 and ground terminal 15, which will clamp the power supply line 12 with ground terminal 15, resulting in a hard short. For example, the low-resistance path may have a resistance of less than 10 mΩ, less than 1 mΩ, or much less than 1 mΩ, which is lower (and potentially much lower) than the tens to hundreds of mΩ of resistance associated with the soft short. This low-resistance path will cause an over-current condition that will be sensed by the power supply 12 or eFuse 18 (see FIG. 1). Accordingly, the power supply 12 or eFuse 18 will automatically and quickly or immediately shut off power from reaching the multiphase voltage regulator device 20.

In one option, the controller 50 may provide the HARDSHORT instruction or signal via the communication line 58 while also ceasing the providing of the control signal or PWM signal via the communication line 52. In another option, the controller 50 may provide the HARDSHORT instruction or signal via the communication line 58 without cessation of or independently of the cessation of the providing of the control signal or PWM signal via the communication line 52, since performing the ceasing of the providing of the control signal or PWM signal via the communication line 52 may result in computational time and/or activity (e.g., by the controller 50) that delays the shutting down of the multiphase voltage regulator device 20 and risks increasing damage to the load 14 and/or other component in the system 10 or external thereto.

Figure 3:
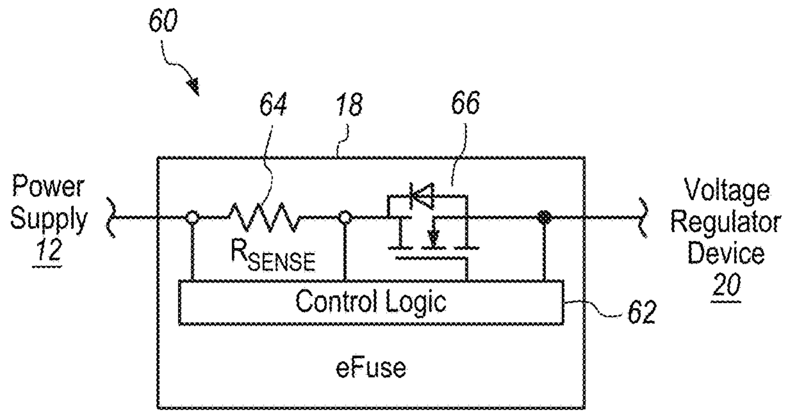
FIG. 3 is a diagram of an eFuse that will shut off power from a power supply in response to detecting an over-current condition.

FIG. 3 is a diagram of an over-current protection circuit 60 in the form of an eFuse 18 that will shut off power from the power supply 12 in response to detecting an over-current condition. The over-current protection circuit 60 may have any available design and the embodiments disclosed herein are not limited to the disclosed design. Optionally, the power supply 12 may include a similar over-current protection circuit 60 such that a separate eFuse 18 is unnecessary.

As shown, the eFuse 18 includes a control logic device 62, a current sense resistor ($R_{sense}$) 64, and a field-effect transistor 66. The control logic device 62 monitors the current sense resistor 64 to obtain a current measurement and controls the field-effect transistor 66 via a connection with a gate of the field-effect transistor 66. Accordingly, when the control logic device 62 detects that the measured current from the current sense resistor 64 has exceeding an over-current protection limit, the control logic device 62 will assert or de-assert a signal to the gate of the field-effect transistor 66 causing the field-effect transistor 66 to turn off (an open circuit). Once the field-effect transistor 66 has been turned off, no power from the power supply 12 is able to reach the multiphase voltage regulator device 20.

Figure 4:
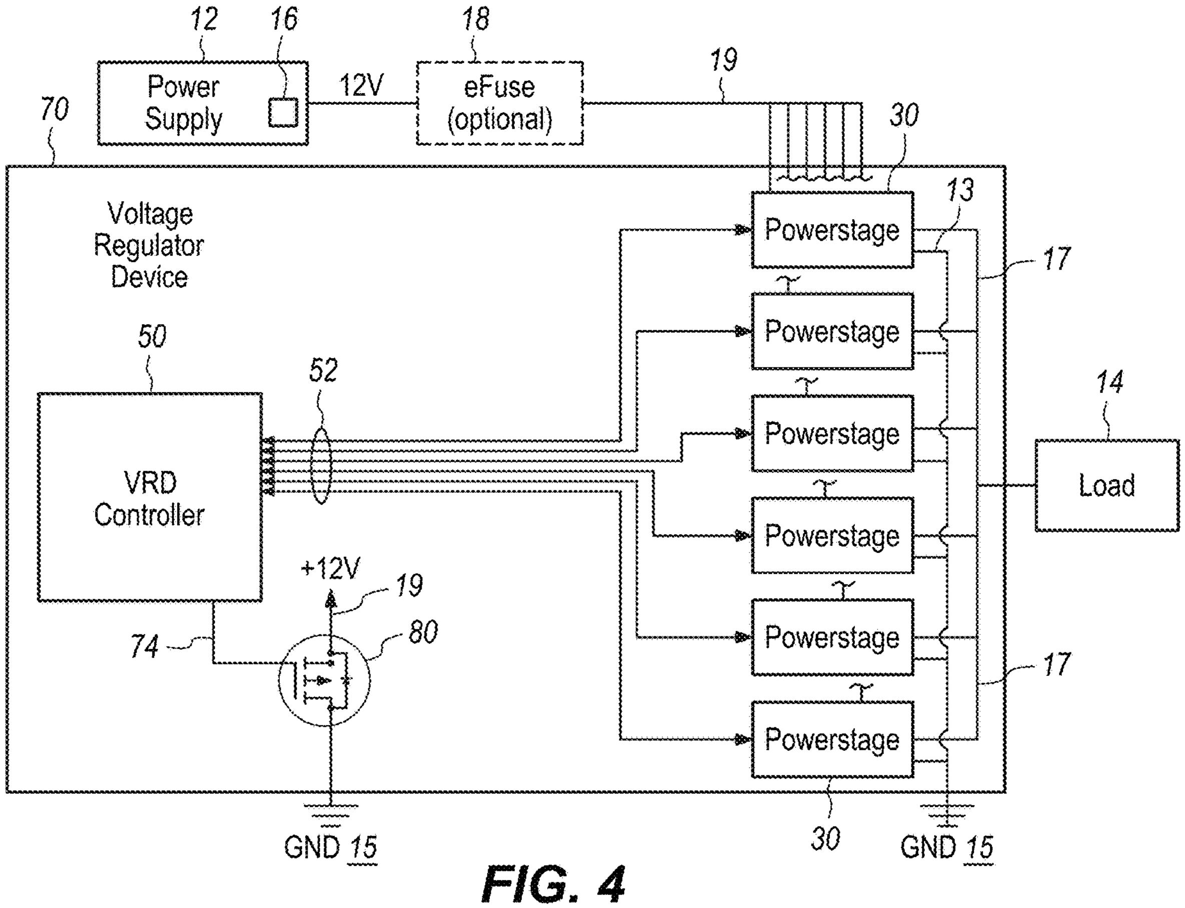
FIG. 4 is a diagram of a voltage regulator device (VRD) according to an alternative embodiment, where the VRD includes a plurality of powerstages and a VRD controller that is connected to each of the powerstages as well as a dedicated FET for causing a hard short.

FIG. 4 is a diagram of a multiphase voltage regulator device (VRD) 70 according to an alternative embodiment, where the multiphase voltage regulator device 70 includes the plurality of powerstages 30 and the controller 50 that is connected to each of the powerstages 30 as well as a dedicated FET 80 for causing a hard short. The powerstages 30 may be the same as described in reference to FIGS. 1 and 2.

The alternative multiphase voltage regulator device 70 include a dedicated FET 80 that is not part of the powerstages 30 and was not included in the voltage regulator device 20 shown in FIG. 1. The dedicated FET 80 has a source terminal connected to the power input 19 (labeled 12 V), a drain terminal connected to ground (GND 15), and a gate that is connected to a dedicated hard short signal line 74. The dedicated FET 80 of FIG. 4 is shown as a p-channel enhancement mode FET, but as with the FETs 34, 36 of FIG. 2, in some embodiments the dedicated FET 80 may be of a different type than that shown in FIG. 4. The controller 50 is configured to assert a hard short signal on the dedicated hard short line 74 to the gate of the dedicated FET 80 in response to identifying that the measured amount of current passing through any of the powerstages is greater than a predetermined current threshold. The hard short signal causes the dedicated FET 80 to turn on and cause a hard short condition by electrically connecting the power input 19 to ground 15. The controller may be connected to the dedicated FET 80 by a driver (not shown), where the driver input is connected to the controller and the driver output is connected to the gate of the dedicated FET 80. Accordingly, turning on this dedicated FET 80 connects the power rail (i.e., 12V source) to ground, which quickly results in an overcurrent condition at the upstream eFuse 18 or power supply 12. The power supply 12 or eFuse 18 will then immediately shut down power to the alternative multiphase voltage regulator device 70.

In one option, the dedicated FET 80 may be secured in a socket (not shown) on a printed circuit board allowing the dedicated FET 80 to be field-replaceable (see FIG. 5) In one option, the hard short signal asserted by the controller 50 on the dedicated hard short line 74 may be the HARDSHORT signal discussed above. In another option, the hard short signal asserted by the controller 50 on the dedicated hard short line 74 may be a power good (PGOOD) signal. The presence (or absence) of the PGOOD signal on the dedicated hard short line 74 may cause the dedicated FET 80 to turn on or conduct, causing the hard short condition discussed above.

Figure 5:
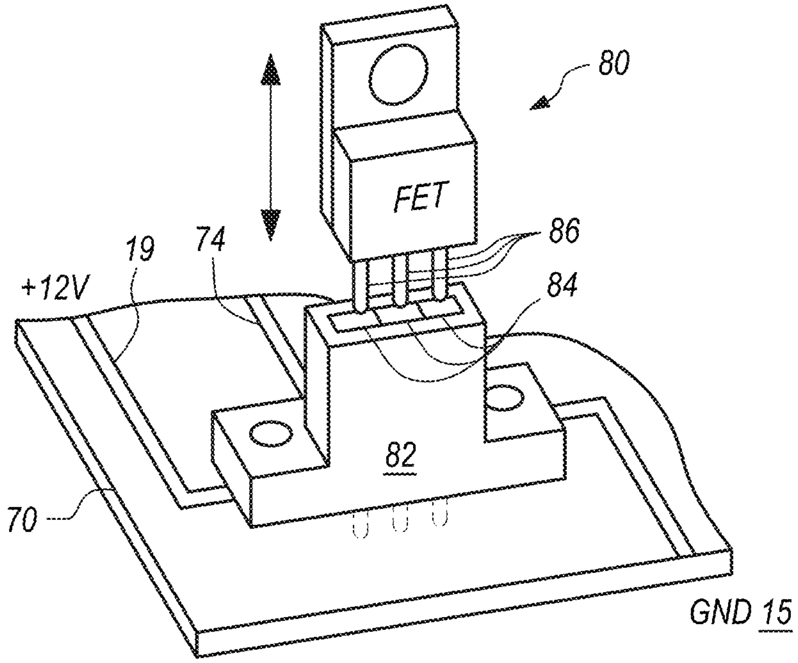
FIG. 5 is a perspective view of a dedicated FET being inserted into a socket on a printed circuit board supporting the voltage regulator device.

FIG. 5 is a perspective view of a dedicated FET 80 being inserted into a socket 82 on a printed circuit board supporting the voltage regulator device 70. The socket 82 includes three connectors 84, each connector 84 configured to selectively receive a pin 86 of the dedicated FET 80. One connector 84 connects the source of the dedicated FET 80 to the power input line 19, one connector 84 connects the drain of the dedicated FET 80 to the ground terminal 15, and one connector 84 connects the gate of the FET 80 to the dedicate hard short line 74 from the controller (not shown). The illustrated configuration of the dedicated FET 80 and the socket 82 enables a user to quickly manually replace the dedicated FET 80 in the field.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A multiphase voltage regulator device, comprising:

a plurality of powerstages coupled in parallel between a power input and a voltage regulator power output, each powerstage of the plurality of powerstages including a power output stage and a control circuit connected to the power output stage;

a controller connected for communication with the control circuit of each powerstage of the plurality of powerstages; and a plurality of current sensors, each current sensor of the plurality of current sensors configured to measure an amount of current passing through the power output stage of each powerstage of the plurality of powerstages, wherein the controller is configured to assert a hard short signal to the control circuit of one or more of powerstages of the plurality of powerstages in response to identifying that the measured amount of current passing through any of the plurality of powerstages is greater than a predetermined current threshold, and wherein the control circuit of each powerstage of the plurality of powerstages that receives the asserted hard short signal is configured to hold the output power stage of the powerstage in a hard short condition in response to receiving the asserted hard short signal by connecting the power input to a ground terminal.

2. The multiphase voltage regulator device of claim 1, wherein, for each powerstage of the plurality of powerstages, the current sensor configured to measure the amount of current passing through the power output stage is included in the powerstage and is configured to report the amount of current to the control circuit of that powerstage, and wherein, for for each powerstage of the plurality of powerstages, the control circuit is configured to report the amount of current to the controller.

3. The multiphase voltage regulator device of claim 1, wherein the controller is configured to provide a control signal to each powerstage of the plurality of powerstages, and wherein the controller is configured to assert the hard short signal to the control circuit of the one or more powerstages of the plurality of powerstages without ceasing providing the control signal the one or more powerstages in response to identifying that the measured amount of current passing through any of the powerstages is greater than the predetermined current threshold.

4. The multiphase voltage regulator device of claim 1, wherein the one or more powerstages of the plurality of powerstages to which the controller asserts the hard short signal includes all of the plurality of powerstages of the multiphase voltage regulator device.

5. The multiphase voltage regulator device of claim 4, further comprising:

a dedicated conductive line connected from the controller to the control circuit of each powerstage of the plurality of powerstages for asserting the hard short signal to each powerstage.

6. The multiphase voltage regulator device of claim 5, wherein the dedicated conductive line includes a loop, a first branch connecting the loop to the controller, and, for each powerstage of the plurality of powerstages, a branch connecting the loop to the control circuit of the powerstage.

7. The multiphase voltage regulator device of claim 5, wherein each powerstage of the plurality of powerstages includes an internal pull down resistor connecting the dedicated conductive line to ground.

8. The multiphase voltage regulator device of claim 1, wherein each power output stage includes a high-side field-effect transistor having a source terminal connected to the power supply, a low-side field-effect transistor having a drain terminal connected to ground, a power output terminal connected between a drain terminal of the high-side field-effect transistor and a source terminal of the low-side field-effect transistor, and an inductor connected between the power output terminal and the load.

9. The multiphase voltage regulator device of claim 8, wherein each powerstage of the plurality of powerstages includes a first driver and a second driver, wherein the first driver has a first driver input connected to the control circuit and a first driver output connected to a gate of the high side field-effect transistor, and wherein the second driver has a second driver input connected to the control circuit and a second driver output connected to a gate of the low side field-effect transistor.

10. The multiphase voltage regulator device of claim 9, wherein, for each powerstage of the plurality of powerstages, the control circuit of the powerstage is configured to hold the output power stage of the powerstage in a hard short condition by causing the first driver to apply a first output voltage to the gate of the high side field-effect transistor to turn on the high side field-effect transistor and causing the second driver to apply a second output voltage to the gate of the low side field-effect transistor to turn on the low side field-effect transistor.

11. A system, comprising:

the multiphase voltage regulator device of claim 1; and a power supply having a power supply output connected to the power input of the multiphase voltage regulator device, wherein the power input is connected to the power output stage of each of the powerstages, and wherein the power supply is configured to remove power from the multiphase voltage regulator device in response to the power supply detecting an over-current condition that is caused by the hard short condition of the one or more powerstages.

12. The system of claim 11, wherein the control circuit holding the output power stage of the one or more powerstages of the plurality of powerstages in a hard short condition places the power supply into the over-current condition.

13. The system of claim 11, wherein the hard short causes a path between the power supply and ground that has a lower resistance than a soft short.

14. The system of claim 11, further comprising:

a computer server, wherein the voltage regulator power output provides power to run multiple components of the computer server.

15. The system of claim 11, wherein the over-current condition is characterized by an amount of current that is greater than an over-current protection limit of the power supply.

16. A system, comprising:

the multiphase voltage regulator device of claim 1;

a power supply having a power supply output for supplying power to the multiphase voltage regulator device; and an eFuse connected between the power supply output and the power input to the multi-stage voltage regulator device, wherein the eFuse is configured to remove power from the multi-stage voltage regulator device in response to the eFuse detecting an over-current condition caused by the hard short condition of the one or more powerstages.

17. A multiphase voltage regulator device, comprising:

a plurality of powerstages coupled in parallel between a power input connector and a voltage regulator power output connector;

a plurality of current sensors, each current sensor measuring the amount of current passing through one of the powerstages of the plurality of the powerstages;

a dedicated field-effect transistor that is separate from the plurality of powerstages, wherein the dedicated field-effect transistor has a source terminal connected to the power input connector, a drain terminal connected to a ground connector, and a gate; and a controller connected to each powerstage of the plurality of powerstages, each current sensor, and the gate of the dedicated field-effect transistor, wherein the controller is configured to assert a hard short signal to the gate of the field-effect transistor in response to identifying that the measured amount of current passing through any of the powerstages is greater than a predetermined current threshold, and wherein the hard short signal causes the dedicated field-effect transistor to turn on and cause a hard short condition by electrically connecting the power input connector to the ground connector.

18. The multiphase voltage regulator device of claim 17, wherein the plurality powerstages, current sensors, dedicated field-effect transistor and controller are installed on a printed circuit board, and wherein the field-effect transistor is secured in a socket on the printed circuit board allowing the external field-effect transistor to be field-replaceable.

19. The multiphase voltage regulator device of claim 17, wherein the hard short signal asserted to the gate of the dedicated field-effect transistor is a power good signal.

20. A method, comprising:

controlling, by a controller of a multiphase voltage regulator device, the operation of a plurality of powerstages of the multiphase voltage regulator device that are coupled in parallel between a power input connector and a voltage regulator power output connector, wherein each powerstage of the plurality of powerstages includes a power output stage and a control circuit that is connected to the power output stage and the controller;

monitoring, by the controller, an amount of current measured by each of a plurality of current sensors, each current sensor of the plurality of current sensors configured to measure an amount of current passing through the power output stage of a respective one of the plurality of powerstages;

identifying, by the controller, that the measured amount of current passing through the power output stage of any of the powerstages of the plurality of powerstages is greater than a predetermined current threshold; and asserting, by the controller, a hard short signal to the control circuit of one or more powerstages of the plurality of powerstages in response to identifying that the measured amount of current passing through the power output stage of any of the powerstages of the plurality of powerstages is greater than the predetermined current threshold, wherein, for the one or more powerstages of the plurality of powerstages receiving the hard short signal, the control circuit of the powerstage is configured to hold the output power stage of the powerstage in a hard short condition by electrically connecting the power input connector to a ground connector in response to receiving the hard short signal.

* * * * *